United States Patent
Yamashita et al.

[11] Patent Number: 5,927,861
[45] Date of Patent: Jul. 27, 1999

[54] MOTOR ASSEMBLY HAVING ION IMPLANTATION ON SLIDING SURFACES

[75] Inventors: Fumitoshi Yamashita, Ikoma; Katsuhiro Murano, Ootsu; Seiji Kurozumi, Osaka; Kazunori Hayashi, Futtsu; Kanao Fukuda, Kawasaki; Masato Inayoshi, Kashiwa, all of Japan

[73] Assignees: Matsushita Electric Industrial Co., Ltd., Osaka; Nippon Steel Corporation, Tokyo, both of Japan

[21] Appl. No.: 08/831,166

[22] Filed: Apr. 1, 1997

Related U.S. Application Data

[63] Continuation-in-part of application No. 08/614,573, Mar. 13, 1996, abandoned.

[30] Foreign Application Priority Data

Mar. 13, 1995 [JP] Japan ................................ 7-52133

[51] Int. Cl.$^6$ .............................. F16C 33/10; F16C 1/24
[52] U.S. Cl. ......................... 384/287; 384/289; 384/371; 384/912
[58] Field of Search .................................. 384/286, 912, 384/287, 289, 368, 371, 397, 403

[56] References Cited

U.S. PATENT DOCUMENTS

| | | | |
|---|---|---|---|
| 4,363,854 | 12/1982 | Hodes et al. | 384/625 |
| 5,063,322 | 11/1991 | Sugita et al. | 384/100 |
| 5,142,174 | 8/1992 | Ide | 384/107 |
| 5,270,737 | 12/1993 | Nakasugi et al. | 384/107 |
| 5,310,490 | 5/1994 | Struglinski et al. | 252/43 |
| 5,310,814 | 5/1994 | Struglinski et al. | 525/314 |
| 5,337,374 | 8/1994 | Konishikawa | 384/107 |
| 5,352,541 | 10/1994 | Tanaka et al. | 384/625 |
| 5,358,339 | 10/1994 | Konno et al. | 384/107 |
| 5,364,248 | 11/1994 | Nakashima et al. | |
| 5,387,461 | 2/1995 | Kamiya et al. | 384/625 |
| 5,417,507 | 5/1995 | Uno et al. | 384/107 |
| 5,466,070 | 11/1995 | Nakasugi | 384/107 |
| 5,532,495 | 7/1996 | Bloomquist et al. | 250/492.21 |
| 5,543,469 | 8/1996 | Struglinski et al. | 525/314 |
| 5,553,948 | 9/1996 | Ito | 384/107 |

FOREIGN PATENT DOCUMENTS

| | | |
|---|---|---|
| 0454616 | 10/1991 | European Pat. Off. . |
| 62-41421 | 2/1987 | Japan . |
| 62-52217 | 3/1987 | Japan . |
| 63-89035 | 4/1988 | Japan . |
| 63-89036 | 4/1988 | Japan . |
| 63-89037 | 4/1988 | Japan . |
| 63-89038 | 4/1988 | Japan . |
| 63-89039 | 4/1988 | Japan . |
| 63-89040 | 4/1988 | Japan . |
| 63-257437 | 10/1988 | Japan . |
| 4-183860 | 6/1992 | Japan . |
| 638442 | 2/1994 | Japan . |

OTHER PUBLICATIONS

"Surface Analysis, Ion Implantation and Tribological Processes Affecting Steels" by I. L. Singer; Applications of Surface Science 18 (1984); pp., 28–62.

"The Metal Vapor Vacuum Arc (MEVVA) High Current Ion Source" by I. G. Brown; IEEE Transactons on Nuclear Science, vol. NS–32, No. 5, Oct. 1985; pp. 1723–1727.

*Primary Examiner*—John A. Jeffery
*Assistant Examiner*—Matthew A. Kaness
*Attorney, Agent, or Firm*—Pollock, Vande Sande & Amernick

[57] ABSTRACT

A motor bearing device includes a bearing member, and a rotary shaft made of steel into which ions of metal element and carbon ions are implanted via a surface of the rotary shaft. The rotary shaft is slidable relative to the bearing member. The metal element is selected from the group consisting of metal elements in the IVa, Va, and VIa groups of the periodic system. Lubricant is provided between the bearing member and the rotary shaft. The surface of the rotary shaft opposes the bearing member.

8 Claims, 1 Drawing Sheet

MOTOR ASSEMBLY HAVING ION IMPLANTATION ON SLIDING SURFACES

CROSS-REFERENCES TO RELATED APPLICATIONS

This is a continuation-in-part of U.S. patent application, Ser. No. 08/614,573, filed on Mar. 13, 1996 now abandoned.

BACKGROUND OF THE INVENTION

1. Field of the Invention

This invention generally relates to a bearing device for a motor such as a spindle motor. This invention particularly relates to a motor assembly having ion implantation on sliding surfaces.

2. Description of the Prior Art

Magnetic disk drives include spindle motors having rotary shafts. It is desirable to suppress a shift or displacement of a spindle-motor shaft along an axial direction. A thrust bearing enables the suppression of an axial shift of a spindle-motor shaft.

Japanese published unexamined patent application 6-38442 discloses a motor for a magnetic disk drive. In the motor of Japanese application 6-38442, a motor base board is provided with spiral projections and spiral recesses which are alternately arranged. The end face of a rotary motor shaft is abutted on the spiral projections. The spiral projections and the spiral recesses serve as a thrust bearing for the motor shaft. When the motor shaft rotates, lubricant in the recesses is pushed against the side walls of the spiral projections and is thus moved inward therealong. At the same time, the lubricant pushes up the end face of the motor shaft, thereby functioning as a fluid bearing for the motor shaft.

Japanese published unexamined patent application 62-52217 discloses that a ball bearing is formed by accommodating a plurality of balls between an outer race and an inner race, and ions are uniformly injected into relative contact moving portions of the bearing structural parts. The ion-injected surfaces of the bearing structural parts enable a decrease in friction and an improvement of the life of the bearing. Japanese application 62-52217 teaches that nitrogen ions, boron ions, carbon ions, or chromium ions are injected into bearing parts of stainless steel or bearing parts of ceramics.

Japanese published unexamined patent application 62-41421 discloses a thrust ball bearing in which ions are injected or implanted into the contact surfaces of bearing parts. The ion implantation enables an improvement of a sliding ability of the bearing and also an enhancement of an abrasion resistance of the bearing. Japanese application 62-41421 teaches that N ions, C ions, Ar ions, Cr ions, Si ions, or B ions are implanted into bearing parts of steel.

Japanese published unexamined patent application 63-89035 discloses that an alloy slide contact material of Au, Pt, Ag, Cu, or Ni is doped with Nb, In, Ba, Ca, or the like by diffusion from its surface to improve an anti-abrasion property.

Japanese published unexamined patent application 63-89036 discloses that an alloy slide contact material of Au, Pt, Ag, Cu, or Ni is doped with Sb, Te, Pb, Se, As, Zn, or the like by diffusion from its surface to improve an anti-abrasion property.

Japanese published unexamined patent application 63-89037 discloses that an alloy slide contact material of Au, Pt, Ag, Cu, or Ni is doped with B, Si, Ge, Tl, or the like by diffusion from its surface to improve an anti-abrasion property.

Japanese published unexamined patent application 63-89038 discloses that an alloy slide contact material of Au, Pt, Ag, Cu, or Ni is doped with Al, Ga, Mn, or the like by diffusion from its surface to improve an anti-abrasion property.

Japanese published unexamined patent application 63-89039 discloses that an alloy slide contact material of Au, Pt, Ag, Cu, or Ni is doped with Co, Sn, Ti, or the like by diffusion from its surface to improve an anti-abrasion property.

Japanese published unexamined patent application 63-89040 discloses that an alloy slide contact material of Au, Pt, Ag, Cu, or Ni is doped with Cr, Mg, Zr, P, or the like by diffusion from its surface to improve an anti-abrasion property.

SUMMARY OF THE INVENTION

It is an object of this invention to provide an improved bearing device for a motor.

A first aspect of this invention provides a motor bearing device comprising a bearing member; a rotary shaft made of steel into which ions of metal element and carbon ions are implanted via a surface of the rotary shaft, the rotary shaft being slidable relative to the bearing member, the metal element being selected from the group consisting of metal elements in the IVa, Va, and VIa groups of the periodic system; and lubricant provided between the bearing member and the rotary shaft; wherein the surface of the rotary shaft opposes the bearing member.

A second aspect of this invention is based on the first aspect thereof, and provides a motor bearing device wherein the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

A third aspect of this invention is based on the first aspect thereof, and provides a motor bearing device wherein at least a sliding part of the bearing member is made of ceramics selected from the group consisting of metal oxides, metal nitrides, and metal carbides.

A fourth aspect of this invention is based on the third aspect thereof, and provides a motor bearing device wherein the ceramics include SiAlON (not trademark/tradename) having a composition of $Si_{6-Z}Al_ZO_ZN_{8-Z}$ ($0<Z\leq4.2$).

A fifth aspect of this invention provides a motor bearing device comprising a bearing member made of steel into which ions of metal element and carbon ions are implanted via a surface of the bearing member, the metal element being selected from the group consisting of metal elements in the IVa, Va, and VIa groups of the periodic system; a rotary shaft being slidable relative to the bearing member; and lubricant provided between the bearing member and the rotary shaft; wherein the surface of the bearing member opposes the rotary shaft.

A sixth aspect of this invention is based on the fifth aspect thereof, and provides a motor bearing device wherein the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

DESCRIPTION OF THE PREFERRED EMBODIMENTS

Basic Embodiments

According to a first basic embodiment of this invention, a motor bearing device includes a bearing member and a rotary shaft made of steel into which ions of metal element and carbon ions are implanted via a surface of the rotary shaft. The rotary shaft is slidable relative to the bearing member. The metal element is selected from the group consisting of metal elements in the IVa, Va, and VIa groups of the periodic system. Lubricant is provided between the bearing member and the rotary shaft. The surface of the rotary shaft opposes the bearing member.

It is preferable that the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

It is preferable that at least a sliding part of the bearing member is made of ceramics selected from the group consisting of metal oxides, metal nitrides, and metal carbides.

It is preferable that the ceramics include SiAlON (not trademark/tradename) having a composition of $Si_{6-Z}Al_ZO_ZN_{8-Z}$ ($0<Z\leq4.2$).

According to a second basic embodiment of this invention, a motor bearing device includes a bearing member made of steel into which ions of metal element and carbon ions are implanted via a surface of the bearing member. The metal element is selected from the group consisting of metal elements in the IVa, Va, and VIa groups of the periodic system. The motor bearing device also includes a rotary shaft slidable relative to the bearing member. Lubricant is provided between the bearing member and the rotary shaft. The surface of the bearing member opposes the rotary shaft.

It is preferable that the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

Specific Embodiments

Figure 1:
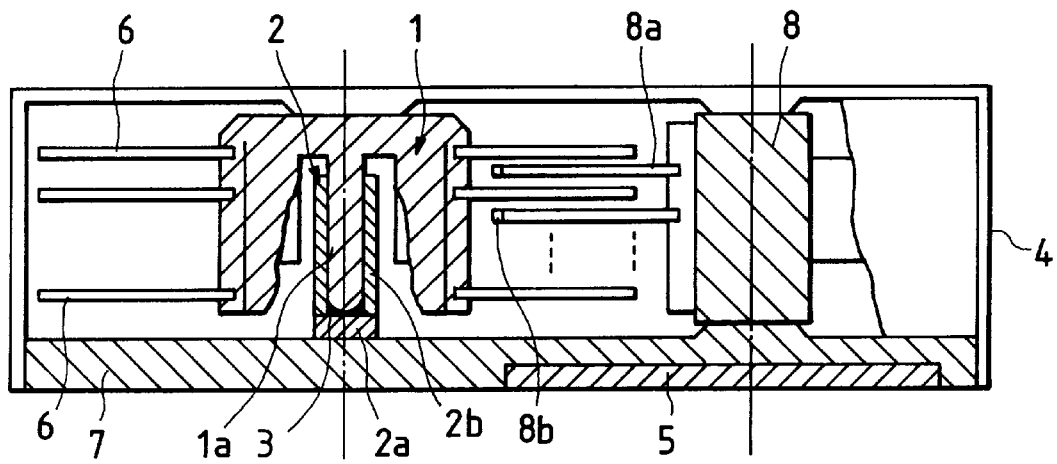
FIG. 1 is a sectional view of a magnetic disk drive including a motor bearing device according to an embodiment of this invention.

With reference to FIG. 1, a magnetic disk drive includes a spindle motor 1, and a base 7 to which bearing members 2 are fixed. The bearing members 2 include a thrust bearing member 2a and a radial bearing member 2b.

The thrust bearing member 2a is placed on an upper surface of the base 7. The radial bearing member 2b is placed on the thrust bearing member 2a. The radial bearing member 2b has a cylindrical shape. The axis of the radial bearing member 2b is perpendicular to the upper surface of the base 7. The thrust bearing member 2a extends between the upper surface of the base 7 and a lower end of the radial bearing member 2b. The radial bearing member 2b defines a hole, the bottom of which is closed by the thrust bearing member 2a.

The spindle motor 1 has a rotary shaft 1a extending into the hole defined by the thrust bearing member 2a and the radial bearing member 2b. Lubricant 3 is provided between the motor shaft 1a and the thrust bearing member 2a, and between the motor shaft 1a and the radial bearing member 2b.

Magnetic recording mediums 6 including magnetic recording disks are mounted on the motor shaft 1a. The magnetic recording mediums 6 rotate together with the motor shaft 1a.

Arms 8a have ends provided with magnetic heads 8b respectively. The arms 8a are connected to a rotary actuator 8. The arms 8a and the magnetic heads 8b can be swung by the rotary actuator 8. The radial positions of the magnetic heads 8b relative to the magnetic recording mediums 6 vary as the arms 8a and the magnetic heads 8b are swung by the rotary actuator 8.

A cover 4 is connected to the base 7. The cover 4 and the base 7 form an interior in which the motor 1, the magnetic recording mediums 6, the arms 8a, the magnetic heads 8b, and the rotary actuator 8 are located.

A lower surface of the base 7 is provided with a control circuit electrically connected to the spindle motor 1 and the rotary actuator 8. The control circuit 5 drives and adjusts the spindle motor 1 and the rotary actuator 8 in response to externally-applied command signals.

During rotation of the motor shaft 1a, the motor shaft 1a slides on the thrust bearing member 2a and the radial bearing member 2b. The lubricant 3 among the motor shaft 1a, the thrust bearing member 2a, and the radial bearing member 2b enables smooth rotation of the motor shaft 1a. During rotation of the motor shaft 1a, the thrust bearing member 2a, the radial bearing member 2b, and the lubricant 3 cooperate to support the motor shaft 1a.

During operation of the magnetic disk drive of FIG. 1, the magnetic recording mediums 6 are rotated by the spindle motor 1 at a speed equal to, for example, about 3,600 rpm. The radial positions of the magnetic heads 8b relative to the magnetic recording mediums 6 are adjustably determined by the rotary actuator 8. During operation of the magnetic disk drive of FIG. 1, information can be recorded on and reproduced from the magnetic recording mediums 6 by the magnetic heads 8b.

The lubricant 3 is, for example, di-2-ethylhexylsebacate (Mw 426, $\eta_{40}$ 11.3 cps) to which buthylester based on stearic acid is added by 3 weight %.

It is preferable that the lubricant 3 is mineral-fluid-based hydrocarbon radical oil or synthetic-fluid-based hydrocarbon radical oil containing an additive or additives. The additive or additives include at least one of a viscosity index improver, an extreme-pressure additive, an oxidation inhibitor, a pour point improver, and an antifoaming agent. The lubricant 3 may be used together with grease, graphite, powder, or a metal thin film. The power has a layered lattice. The powder is made of, for example, $MoS_2BN$. The metal thin film is made of, for example, In, Cu, or Pb. The lubricant 3 may be a mixture of the previously-indicated additive-containing oil and grease, graphite, the previously-indicated powder, or the previously-indicated metal thin film.

The thrust bearing member 2a and the radial bearing member 2b are made of, for example, metal or steel. The thrust bearing member 2a and the radial bearing member 2b may be made of ceramics.

The motor shaft 1a is made through ion implantation processes as indicated later. The ion implantation processes are executed by an apparatus in which an arc discharge is generated in a vacuum to vaporize a cathode material into ions. The ion implantation apparatus includes a grid electrode subjected to a high voltage. The high voltage to the grid electrode accelerates the ions, thereby making the ions into an ion beam applied to a base material or a workpiece. Thus, the ions are implanted into the base material.

Figure 2:
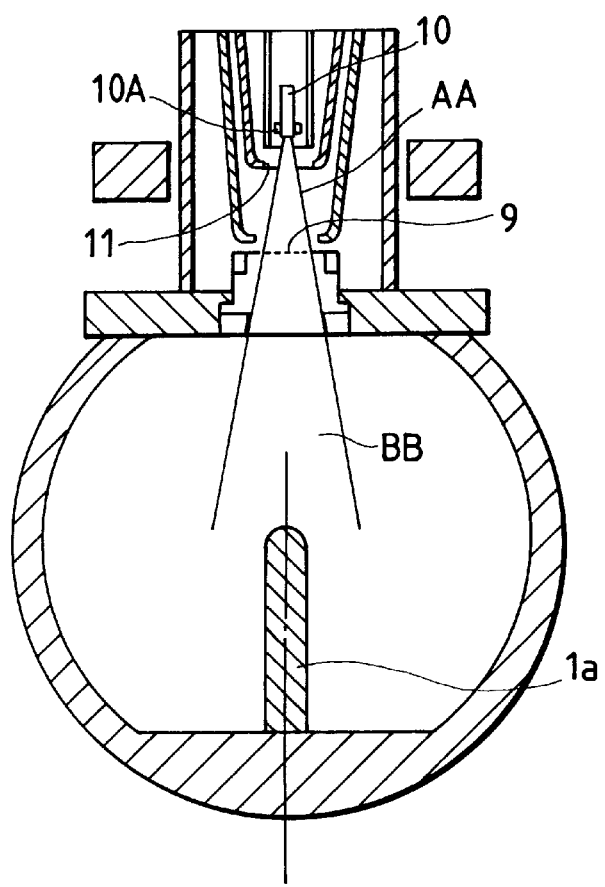
FIG. 2 is a sectional diagram of an ion implantation apparatus.

FIG. 2 shows an example of the ion implantation apparatus. The ion implantation apparatus of FIG. 2 has a housing defining a vacuum chamber in which an original member (a base member) for the motor shaft 1a is placed. Also, the ion implantation apparatus has a cathode 10 and an anode 11 located in the vacuum chamber. A cathode material 10A is placed on the cathode 10. An arc discharge is generated between the cathode 10 and the anode 11. The arc discharge vaporizes the cathode material 10A into ions "AA". The ion implantation apparatus has a grid electrode 9 located in the vacuum chamber and subjected to a high voltage. The high voltage to the grid electrode 9 accelerates the ions "AA", thereby making the ions "AA" into an ion beam "BB" applied to the original member for the motor shaft 1a. Thus, the ions "AA" are implanted into the original member for the motor shaft 1a via surfaces thereof which will form sliding surfaces opposing the thrust bearing member 2a and the radial bearing member 2b (see FIG. 1).

The cathode material 10A is made of, for example, metal element selected from among metal elements in the IVa, Va, and VIa groups of the periodic system. The cathode material 10A may be solid solution of carbon.

A sample of the motor shaft 1a was made as follows. A solid cylinder of hardened stainless steel was prepared as an original member or a base member for the sample of the motor shaft 1a. The solid cylinder had an outside diameter of 2.5 mm. The solid cylinder had an approximately hemispherical end with a curvature corresponding to a radius of 4 mm. Titanium ions and carbon ions were implanted into the solid cylinder via an end surface thereof to complete the sample of the motor shaft 1a. It should be noted that the end surface of the solid cylinder will oppose a thrust bearing member in a spindle motor. During the implantation of titanium ions, the acceleration voltage was equal to 70 kv (about 147 keV). The implantation rate of titanium ions was equal to $5 \times 10^{17}$ dose (ion/cm$^2$). During the implantation of carbon ions, the acceleration voltage was equal to 40 kv (about 40 keV). The implantation rate of carbon ions was equal to $1.2 \times 10^{18}$ dose (ion/cm$^2$). The completed sample of the motor shaft 1a is referred to as the ion-implanted motor shaft "A".

A reference motor shaft "B" was made as follows. A solid cylinder of hardened stainless steel was prepared as an original member or a base member for the reference motor shaft "B". The solid cylinder had an outside diameter of 2.5 mm. The solid cylinder had an approximately hemispherical end with a curvature corresponding to a radius of 4 mm. A film of Cr/N (1:1) was formed on an end surface of the solid cylinder by a Cr vapor deposition process and an N-ion irradiation process to complete the reference motor shaft "B". The Cr vapor deposition process and the N-ion irradiation process were simultaneously executed. The film of Cr/N had a thickness of 2 $\mu$m.

A reference motor shaft "C" was made as follows. A solid cylinder of hardened stainless steel was prepared as an original member or a base member for the reference motor shaft "C". The solid cylinder had an outside diameter of 2.5 mm. The solid cylinder had an approximately hemispherical end with a curvature corresponding to a radius of 4 mm. A film of TiN/TiC: N (7:3)TiN was formed on an end surface of the solid cylinder by an ion plating process to complete the reference motor shaft "C".

A reference motor shaft "D" was a solid cylinder of hardened stainless steel. The solid cylinder had an outside diameter of 2.5 mm. The solid cylinder had an approximately hemispherical end with a curvature corresponding to a radius of 4 mm.

First and second samples of the thrust bearing member 2a were prepared. The first sample of the thrust bearing member 2a was a disk of SiAlON (not trademark/tradename) or ceramics having a composition of $Si_{6-Z}Al_ZO_ZN_{8-Z}$ ($0 \leq Z < 4.2$). The second sample of the thrust bearing member 2a was made of SK steel (SK-2).

In the case where a spindle motor is rotated at a speed of 5,400 rpm for $10^4$ H (hours) while being subjected to an axial load of 60 g, an example of a desirable axial displacement (shift) of a motor shaft is equal to 40 $\mu$m or less. A consideration will now be given of a motor shaft which has an approximately hemispherical end with a curvature corresponding to a radius of 4 mm. Under the conditions where such a motor shaft is subjected to an axial load of 60 g and is in resilient contact with a disk-shaped thrust bearing member made of SiAlON, an estimated radius of an area of contact between the motor shaft and the thrust bearing member is equal to about 24 $\mu$m. In addition, an estimated maximal contact pressure is equal to about 45 kgf/mm$^2$ at an end surface of the motor shaft. Furthermore, an estimated sinkage of the motor shaft is equal to about 0.11 $\mu$m. Generally, lubricant provided between such a motor shaft and a thrust bearing member is incapable of forcing the motor shaft and the thrust bearing member into fluid lubrication. Thus, relative sliding between the motor shaft and the thrust bearing member is usually in a mixed lubrication state. It is now assumed that a resultant axial displacement (shift) of such a motor shaft is equal to 40 $\mu$m after a spindle motor is rotated at a speed of 5,400 rpm for $10^4$ H. In this case, an estimated last radius of an area of contact between the motor shaft and the thrust bearing member is equal to about 540 $\mu$m. In addition, an estimated wear volume (abrasion volume) is equal to about 0.02 mm$^3$. Furthermore, an estimated mean sliding radius is equal to about 200 $\mu$m. Accordingly, a desirable relative wear rate (abrasion rate) is equal to $10^{-11}$ mm$^2$/N or less.

First, second, third, fourth, fifth, sixth, seventh, and eighth spindle motors were fabricated. The first spindle motor used the ion-implanted motor shaft "A" and the first sample of the thrust bearing member 2a (the ceramic bearing member). The second spindle motor used the ion-implanted motor shaft "A" and the second sample of the thrust bearing member 2a (the steel bearing member). The third spindle motor used the reference motor shaft "B" and the first sample of the thrust bearing member 2a (the ceramic bearing member). The fourth spindle motor used the reference motor shaft "B" and the second sample of the thrust bearing member 2a (the steel bearing member). The fifth spindle motor used the reference motor shaft "C" and the first sample of the thrust bearing member 2a (the ceramic bearing member). The sixth spindle motor used the reference motor shaft "C" and the second sample of the thrust bearing member 2a (the steel bearing member). The seventh spindle motor used the reference motor shaft "D" and the first sample of the thrust bearing member 2a (the ceramic bearing member). The eighth spindle motor used the reference motor shaft "D" and the second sample of the thrust bearing member 2a (the steel bearing member).

First experiments were performed on the first, second, third, fourth, fifth, sixth, seventh, and eighth spindle motors. The first experiments related to conditions where any lubricant was not provided between the motor shaft and the thrust bearing member in each of the first, second, third, fourth, fifth, sixth, seventh, and eighth spindle motors. During the first experiments, each of the first, second, third, fourth, fifth, sixth, seventh, and eighth spindle motors was rotated at a speed of 5,400 rpm for 300 H while being subjected to an axial load of 60 g. Regarding each of the first, second, third, fourth, fifth, sixth, seventh, and eighth spindle motors, an axial displacement (shift) of the motor shaft was measured after the rotation. The measured axial displacement of the motor shaft in the first spindle motor was equal to 228 μm. The measured axial displacement of the motor shaft in the second spindle motor was equal to 264 μm. The measured axial displacement of the motor shaft in the third spindle motor was equal to 298 μm. The measured axial displacement of the motor shaft in the fourth spindle motor was equal to 328 μm. The measured axial displacement of the motor shaft in the fifth spindle motor was equal to 343 μm. The measured axial displacement of the motor shaft in the sixth spindle motor was equal to 523 μm. The measured axial displacement of the motor shaft in the seventh spindle motor was equal to 288 μm. The measured axial displacement of the motor shaft in the eighth spindle motor was equal to 369 μm. Thus, it was confirmed that the ion-implanted motor shaft "A" was better than the reference motor shafts "B", "C", and "D" in axial displacement.

Regarding each of the first, second, third, fourth, fifth, sixth, seventh, and eighth spindle motors, a relative wear rate (abrasion rate) was measured after the rotation in the first experiments. All the measured relative wear rates were equal to about $10^9$ mm$^2$/N. To attain a relative wear rate of $10^{-11}$ mm$^2$/N or less, it is preferable to use lubricant between the motor shafts and the bearing members.

The reference motor shaft "D" was better than the reference motor shaft "C" in axial displacement. The reason for this fact is believed to be as follows. During motor rotation, a film of TiN/TiC: N (7:3)/TiN exfoliates from a motor shaft body, and resultant exfoliated film fragments enter a region between the motor shaft body and the bearing members and facilitate wear of the motor shaft body.

Second experiments were performed on the first, second, third, fourth, fifth, sixth, seventh, and eighth spindle motors. The second experiments related to conditions where lubricant was provided between the motor shaft and the thrust bearing member in each of the first, second, third, fourth, fifth, sixth, seventh, and eighth spindle motors. The lubricant was di-2-ethylhexylsebacate (Mw 426, $\eta_{40}$ 11.3 cps) to which buthylester based on stearic acid was added by 3 weight %. During the second experiments, each of the first, second, third, fourth, fifth, sixth, seventh, and eighth spindle motors was rotated at a speed of 5,400 rpm for 300 H while being subjected to an axial load of 60 g. Regarding each of the first, second, third, fourth, fifth, sixth, seventh, and eighth spindle motors, an axial displacement (shift) of the motor shaft was measured after the rotation. The measured axial displacement of the motor shaft in the first spindle motor was smaller than 1 μm. The measured axial displacement of the motor shaft in the second spindle motor was equal to 3 μm. The measured axial displacement of the motor shaft in the third spindle motor was equal to 6 μm. The measured axial displacement of the motor shaft in the fourth spindle motor was equal to 30 μm. The measured axial displacement of the motor shaft in the fifth spindle motor was equal to 5 μm. The measured axial displacement of the motor shaft in the sixth spindle motor was equal to 28 μm. The measured axial displacement of the motor shaft in the seventh spindle motor was equal to 11 μm. The measured axial displacement of the motor shaft in the eighth spindle motor was equal to 49 μm. Thus, it was confirmed that the ion-implanted motor shaft "A" was better than the reference motor shafts "B", "C", and "D" in axial displacement.

Regarding each of the first, second, third, fourth, fifth, sixth, seventh, and eighth spindle motors, a relative wear rate (abrasion rate) was measured after the rotation in the second experiments. All the measured relative wear rates were smaller than $10^{-11}$ mm$^2$/N.

Third experiments were performed on the first spindle motor. The third experiments related to conditions where lubricant was provided between the motor shaft and the thrust bearing member. The lubricant was di-2-ethylhexylsebacate (Mw 426, $\eta_{40}$ 11.3 cps) to which buthylester based on stearic acid was added by 3 weight %. During the third experiments, the first spindle motor was rotated at a speed of 5,400 rpm for 5,000 H while being subjected to an axial load of 60 g. An axial displacement (shift) of the motor shaft was measured after the rotation. The measured axial displacement of the motor shaft in the first spindle motor was smaller than 10 μm.

It should be noted that at least one of the thrust bearing member 2a and the radial bearing member 2b may be made through ion implantation processes. In this case, ions are implanted via a bearing-member surface which will oppose the motor shaft 1a.

This invention may also be applied to a spindle motor for driving a polygon mirror in a printer.

What is claimed is:

1. A motor bearing device comprising:

a bearing member;

a rotary shaft made of steel into which ions of metal element and carbon ions are implanted via a surface of the rotary shaft after the steel has been formed, the rotary shaft being slidable relative to the bearing member, the metal element being selected from the group consisting of metal elements in the IVa, Va, and VIa groups of the periodic system; and lubricant provided between the bearing member and the rotary shaft;

wherein the surface of the rotary shaft opposes the bearing member.

2. The motor bearing device of claim 1, wherein the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

3. The motor bearing device of claim 1, wherein at least a sliding part of the bearing member is made of ceramics selected from the group consisting of metal oxides, metal nitrides, and metal carbides.

4. The motor bearing device of claim 3, wherein the ceramics include SiAlON having a composition of $Si_{6-Z}Al_ZO_ZN_{8-Z}$ ($0<Z\leq4.2$).

5. The motor bearing device of claim 1 wherein the bearing member includes a thrust bearing member opposite one end of said rotary shaft, and a radial bearing member around a circumferential portion of said rotary shaft.

6. A motor bearing device comprising:

a bearing member made of steel into which ions of metal element and carbon ions are implanted via a surface of the bearing member after the steel has been formed, the metal element being selected from the group consisting of metal elements in the IVa, Va, and VIa groups of the periodic system;

a rotary shaft being slidable relative to the bearing member; and lubricant provided between the bearing member and the rotary shaft;

wherein the surface of the bearing member opposes the rotary shaft.

7. The motor bearing device of claim 6, wherein the ions of the metal element include titanium ions, an implantation rate of the titanium ions is in the range of $10^{16}$ to $10^{20}$ dose (ion/cm$^2$), an implantation rate of the carbon ions is in the range of $10^{17}$ to $10^{20}$ dose (ion/cm$^2$), and the implantation rate of the carbon ions is equal to or greater than the implantation rate of the titanium ions.

8. The motor bearing device of claim 6 wherein the bearing member includes a thrust bearing member opposite one end of said rotary shaft, and a radial bearing member around a circumferential portion of said rotary shaft.

* * * * *